United States Patent [19]
Zipin

[11] 3,957,378
[45] May 18, 1976

[54] TWO-AXIS MOIRE FRINGE DISPLACEMENT TRANSDUCER

[75] Inventor: Richard B. Zipin, Englewood, Ohio

[73] Assignee: The Bendix Corporation, Southfield, Mich.

[22] Filed: Nov. 25, 1974

[21] Appl. No.: 526,778

[52] U.S. Cl. .............................. 356/169; 250/237 G
[51] Int. Cl.² ..................... G01B 9/02; G01B 11/02; G01B 11/04
[58] Field of Search .................... 356/169, 170, 111; 250/237 G

[56] References Cited
UNITED STATES PATENTS

| | | | |
|---|---|---|---|
| 3,756,723 | 9/1973 | Hock | 356/169 X |
| 3,768,911 | 10/1973 | Erikson | 356/169 |
| 3,806,254 | 4/1974 | Ha et al. | 356/169 |
| 3,867,035 | 2/1975 | Kaul | 356/169 X |
| 3,867,038 | 2/1975 | Westell | 250/237 G |

*Primary Examiner*—Robert Segal
*Attorney, Agent, or Firm*—John R. Benefiel

[57] ABSTRACT

A two-axis Moire fringe displacement transducer is disclosed in which the scale grating is inscribed with a grid pattern consisting of two superimposed orthogonal optical line sets and the index grating is inscribed with at least two discrete optical grating patterns, each of the at least two grating patterns aligned with a respective grid grating set such as to generate Moire fringe patterns in a respective grating upon relative movement along each orthogonal direction.

2 Claims, 7 Drawing Figures

U.S. Patent May 18, 1976 Sheet 3 of 3 3,957,378
FIG.6
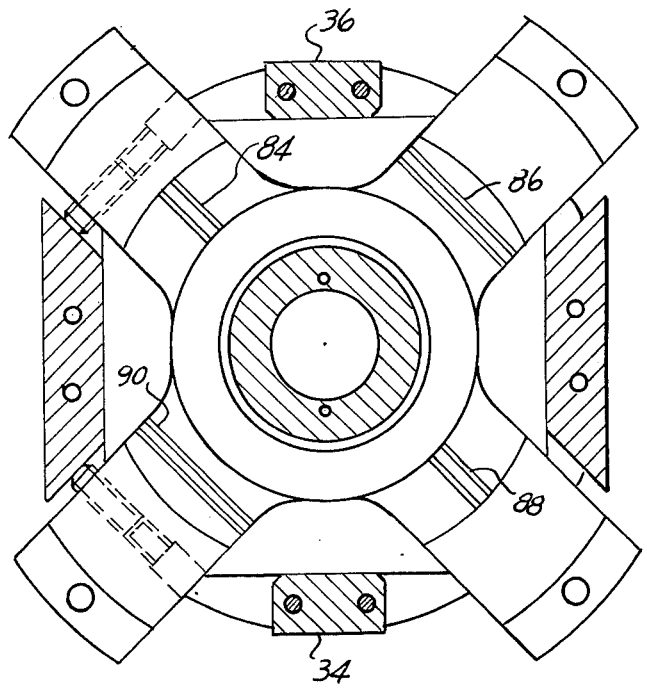
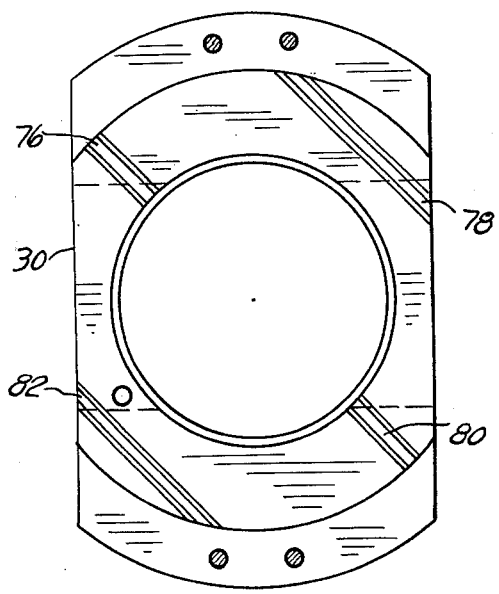
FIG.7

TWO-AXIS MOIRE FRINGE DISPLACEMENT TRANSDUCER

BACKGROUND OF THE INVENTION

1. Field of the Invention

This invention concerns displacement transducers and more particularly displacement transducers of the electro-optic type in which optical gratings are utilized to generate a shadow pattern (known as a Moire fringe) which shifts with relative movement between the two gratings. This shifting pattern is detected by means of photodetectors which generate electrical signals which are amplified and processed to produce digital pulse trains corresponding to the direction and extent of relative movement between the gratings.

2. Description of the Prior Art

Moire fringe displacement transducing arrangements as described in U.S. Pat. Nos. 2,886,717 and 2,886,718, and as described above have for various reasons enjoyed considerable success in the context of coordinate measuring machines, such as disclosed in U.S. Pat. Nos. 3,774,311; 3,757,423; 3,403,448. These machines have usually taken the form of a probe shaft supported for linear movement along a first (Z) axis, the probe shaft support being supported for linear movement along a second (Y) axis orthogonal to the first axis on a carriage which is in turn supported for movement along a third (Y) axis orthogonal to the first and second axes.

Movement along each axis is detected by means of the Moire fringe transducer, i.e., a scale grating is affixed to each of the supporting members aligned with movement therealong and an index piece is carried by the member supported and positioned so as to produce the Moire fringe described.

For various reasons known to those skilled in this art, it is often desirable for the probe shaft to support a probe which is capable of limited detected movement in the plane orthogonal to its axis independently of the means of movement comprised by the supporting structure described above.

While it would be advantageous to detect such movement by a similar Moire fringe transducer means carried within the probe since the signals produced would be directly usable by existing system electronics, such an arrangement has not heretofore been provided which was sufficiently compact to be carried within the confines of the probe.

For example, the two-axis transducer arrangement shown in U.S. Pat. No. 3,184,600 while producing a pulse type output upon movement of a probe in a plane utilizes a relatively bulky mechanical linkage to maintain proper orientation of the axes, which approach would not be feasible in this context. In addition, the effective control by this linkage in precisely maintaining the orientation of the grid and the index piece carried by the probe is difficult to achieve.

It has also been discovered that in utilizing offset grid patterns as described in U.S. Pat. No. 2,886,717 to produce relatively phased signals for the purpose of detecting direction of movement, if the offset patterns are positioned relative each other in areas offset from each other in a direction aligned with the grating lines, the signal phasing is highly sensitive to slight skewing rotations of the grating pattern such as induced by torques applied thereto. Since such probes are sometimes used in modes tending to apply torsional loads about the probe axis, this sensitivity could create signal errors.

It is, therefore, an object of the present invention to provide a compact multi-axis Moire fringe transducer arrangement suitable for such applications.

It is a further object to provide a grating pattern arrangement utilizing offset line sets which are relatively insensitive to rotation of the pattern relative the grid pattern.

SUMMARY OF THE INVENTION

This object and others which will become apparent upon a reading of the following specification and claims is accomplished according to the present invention by a probe assembly carrying a scale grating inscribed with a grid pattern consisting of two superimposed orthogonal optical grating sets and also carrying an index grating inscribed with at least two signal patch patterns consisting of discrete optical gratings, each one of the at least two patterns aligned with a respective grid grating set such as to generate Moire fringe patterns upon relative movement along each orthogonal direction. The probe assembly includes grid support and an index piece support for limited relative movement along orthogonal directions with the grid and index patterns affixed to respective portions and aligned with such orthogonal directions so as to generate the Moire patterns by means of a cross-slide support arrangement which allows relative linear movement between the grid and index supports but preventing relative angular movement therebetween. The patch patterns are composed of pairs of offset grating patterns positioned in a crossing side-by-side relationship to greatly reduce sensitivity to torsional loads applied to the probe, and to minimize the size of the pattern.

DESCRIPTION OF THE DRAWINGS

FIG. 6 is a view of the section 6—6 taken in FIG. 3;

FIG. 7 is a view of the section taken along the line 7—7 in FIG. 2.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Figure 1:
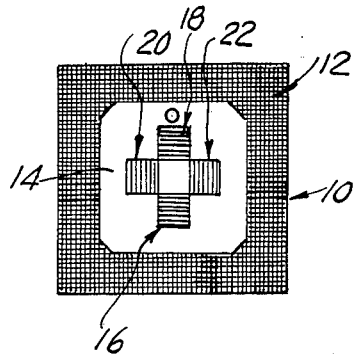
FIG. 1 is a diagrammatic representation of the grid-index arrangement according to the present invention.
Figure 2:
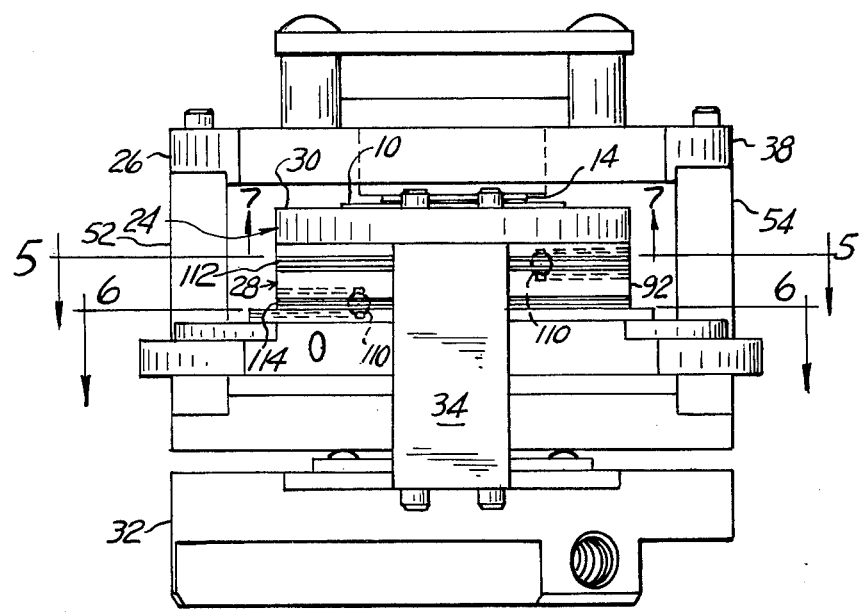
FIG. 2 is an elevational view of an embodiment of the two-axis transducer according to the present invention.
Figure 3:
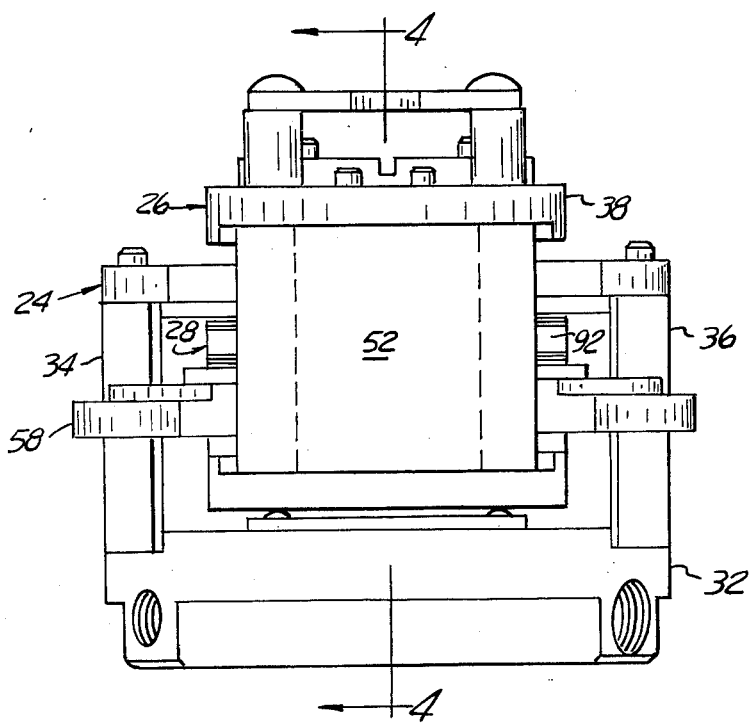
FIG. 3 is a side elevational view of the transducer embodiment shown in FIG. 2.
Figure 4:
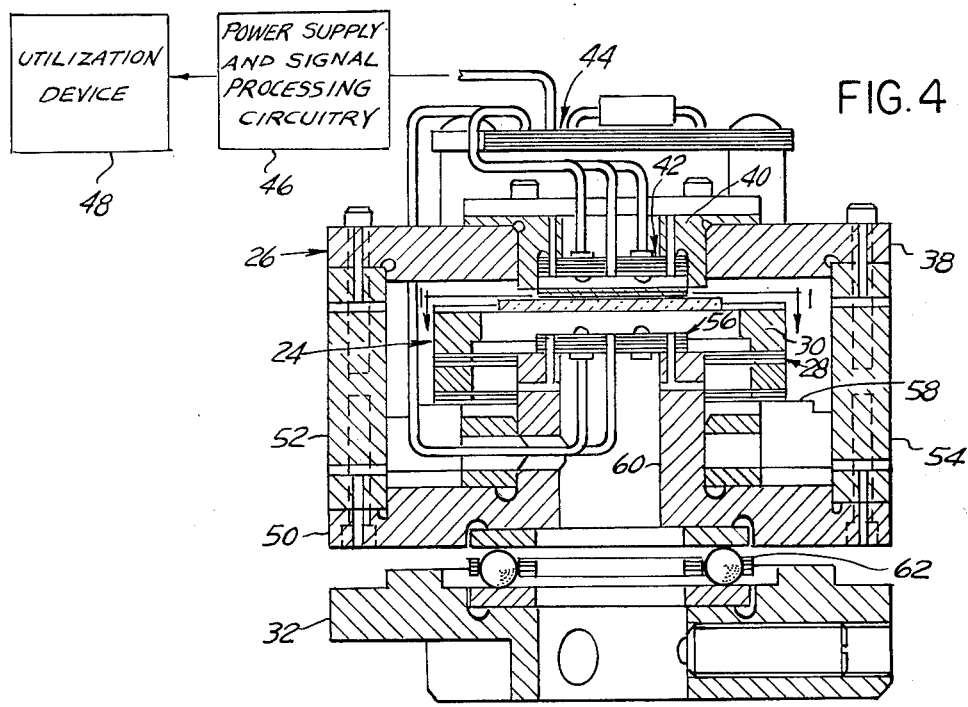
FIG. 4 is a view of the section 4—4 taken in FIG. 2.
Figure 5:
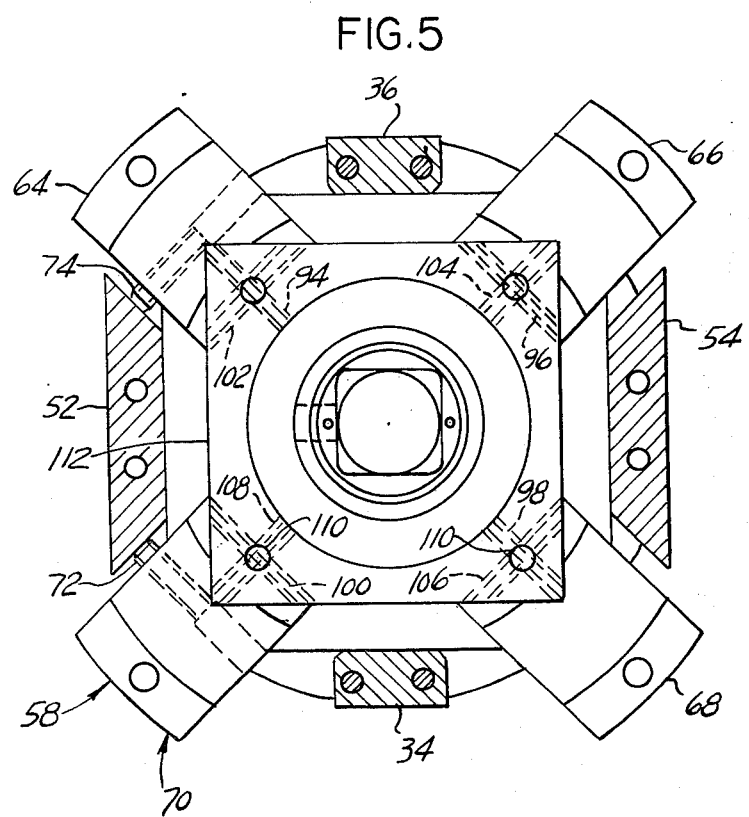
FIG. 5 is a view of the section 5—5 taken in FIG. 2.

Referring to the Drawings, and particularly FIG. 1 which best shows the basic arrangement according to the present invention.

This arrangement consists of a grid piece 10 formed with a transversely crossed orthogonal optical grating pattern 12. Such optical patterns and their method of manufacture in the context of non-crossing line sets are now well known in the art and a detailed description is not here necessary to a proper understanding of the present invention. Suffice it to say that it is contemplated that for purposes of the present invention, the grid piece 10 is formed with two such known optical grating patterns with the line sets in each pattern extending crossing each other so as to have an orthogonal relationship therebetween.

Juxtaposed above the grid piece 10 is an opaque index piece 14 having two signal patch sets, each set comprised of pairs of windows 16 and 18 and 20 and 22, respectively.

Windows 16, 18, and 20, 22 are each formed with such optical gratings having parallel line sets which are substantially aligned with respect to a respective one of the crossing optical patterns formed on the grid piece 10 such that a Moire fringe pattern will be formed upon illumination of the superimposed pattern in the manner well known to those skilled in the art.

As will be noted, the gratings formed in the windows 16, 18 and 20, 22 are positioned with respect to each other so as to be in side-by-side relationship. It has been discovered that this particular arrangement reduces greatly the effect of slight skewing movements of the index piece 14 relative the grid on the phase relationship of the patterns formed in each of the window sets 16, 18 and 20, 22 such as could be induced by torsional loads imposed on the probe carrying the index piece 14 and grid 10 as compared to the arrangement wherein the gratings are aligned with each other.

In addition, the arrangement shown wherein the window gratings are arranged in a crossing pattern minimizes the physical dimension of the overall pattern so as to be more capable of being utilized in a multi-axis probe application. And, in addition, arranging both sets side-by-side insures that the skewing has a similar effect on the pattern for both sets so that skewing adjustments of the index piece 14 relative to the grid 12 as will be described hereinafter can properly set both pattern sizes simultaneously.

As is also well known in the art, the relative size and position of the Moire shadow may be adjusted by slightly skewing the gratings with respect to each other. In this context, it is contemplated that the window gratings will be capable of being angularly adjusted with respect to the piece 10 to produce a shadow size which is matched to the size of the photodetectors used to detect the pattern. An arrangement for carrying out such an adjustment will be described herein.

When the gratings are so skewed, this pattern of light and dark areas shifts transversely upon relative movement between the two grids in cyclical fashion such that by monitoring the cyclic variation in intensity at a given point, a signal corresponding precisely to the extent of movement may be generated. Furthermore, detection of the relative phase of such transversely shifting pattern can supply information as to the direction of such relative movement.

Commonly, such phase is detected by means of a plurality of photocells aligned transversely to the direction of movement, but in the present case in the interests of increased compactness and other advantages, the pattern phase is detected by offsetting the line pattern in each window of each set such that the Moire fringe produced at the window is 90° out of phase with the other window in its set, i.e., by offsetting the line pattern by one quarter pitch, and providing a photocell for each window 16, 18 and 20, 22 to provide such directional information.

This has the additional advantage of eliminating the well known tedious calibrating alignments required in arrangements involving a plurality of photocells reading a single pattern, inasmuch as the phase relationship is established by the system geometry in turn established at the time of manufacture of the device.

In order to properly operate, the grid 10 and index piece 14 must of course be constrained to move relative each other to be precisely aligned so as to maintain the proper angular relationship in either axis of movement. An arrangement for providing such constrained movement is depicted in FIGS. 2–7, which arrangement would be suitable for incorporation into a probe assembly for a coordinate measuring machine as described above.

This arrangement consists basically of a grid support structure 24 and an index piece support structure 26, which are supported relative each other by means of a cross-slide assembly 28 so as to be constrained to move along two orthogonally related axes which are properly aligned relative to the grid 10 and index optical grating patterns as described above, and are adapted to be mounted to respective portions of the probe shaft assembly (not shown) of a coordinate measuring machine.

The grid support structure 24 includes a grid holder plate 30 to which is affixed the grid 10, the grid holder plate 30 in turn being fixed to a grid cap member 32 by means of a pair of grid posts 34 and 36 secured to both members.

The grid cap member 32 is in practice adapted to be connected to the probe tip (not shown).

The index piece support structure 26 includes an index plate 38 to which is affixed an index piece holder 40 carrying the index piece 14.

A photodetector assembly 42 is also carried by the index piece holder 40, positioned and adapted to detect the fringe pattern and transmit corresponding electrical signals via a cable assembly 44 to power supply and signal processing circuitry 46 prior to being transmitted to a utilization device 48 such as a digital display.

The index plate 38 is connected to an index pivot plate 50 by means of index posts 52 and 54 fastened to both members, index pivot plate 50 carrying a light source assembly 56 positioned to illuminate the grid and index pieces 10 and 14 respectively in the known manner, which assembly is powered by the cable assembly 44 connection with the power supply and signal processing circuitry 46.

The index piece support structure 26 is adapted to be carried within a bore formed in a probe shaft housing (not shown) by means of a grid V-bridge 58 which is received over a boss portion 60 of the index plate 50 and positioned axially thereon by virtue of the grid posts 34 and 36 sandwiching the grid holder plate 30, the cross-slide assembly 28, the grid V-bridge 58, the index plate 50, a thrust bearing 62 and the grid cap 32.

The grid V-bridge 58 includes four radiused proturberances 64, 66, 68, and 70 which are adapted to be received within a probe shaft housing (not shown) and secured thereto as mentioned above.

Angular adjustment of the grid support structure 24 with respect to the index piece support structure 26 is provided by means of a pair of set screws 72 and 74 engaging index post 52 to properly adjust the skew between the grid 10 and index piece 14 to produce the proper size Moire fringe pattern to match the photodetector size as well as to "fine tune" the phase angle.

The cross-slide assembly 28 includes parallel V-grooves 76, 78, 80 and 82 formed in the grid V-holder 30, parallel V-grooves 84, 86, 88 and 90 formed in the grid V-bridge 58 and extending orthogonally thereto. Also included therein is an intermediate V-separator member 92 having upper V-grooves 94, 96, 98 and 100 parallel and juxtaposed V-grooves 76, 78, 80 and 82, and lower V-grooves 102, 104, 106 and 108 parallel and juxtaposed to V-grooves 84, 86, 88 and 90.

Cross-slide assembly 28 further includes eight bearing balls 110, one disposed in each juxtaposed V-groove set, together with ball cages 112 and 114 provided to retain the balls 110.

Thus, the grid support structure 24 fixed relative the grid 12 is fixed anguarly and axially with respect to the index support structure 26 which is fixed relative the index piece 14, while relative linear movement therebetween is allowed by the constraint exerted by the intermediate V-separator member 92. Such relative movement therebetween is also accommodated by the thrust bearing 62 which cooperates with the other structure described to prevent relative axial movement.

It can be appreciated that this structure is quite compact and yet is quite effective at maintaining the proper angular relationship even when torsional loads are imposed on the probe tending to rotate these structures relative each other about the probe axis.

Accordingly, a single index piece and grid provides output signals indicative of movement in two axes to accomplish the above-described object.

It is to be understood that the invention is not limited to the embodiment described nor to the particular application here contemplated. For example, other phase sensing arrangements or reflection rather than transmission gratings could be utilized.

Also, while two window signal patch sets are disclosed, four window sets could be utilized with a 90° phase relationship therebetween which has the advantage of common mode signal rejection as is well known. However, such an arrangement would increase the size of the transducer, compromising to some extent one advantage of the present invention.

What is claimed is:

1. A displacement transducer comprising:
    an index piece having a plurality of index optical grating patterns formed thereon, two of said plurality of optical gratings disposed with the grating rulings extending in orthogonal directions to each other, each of said optical gratings comprised of two optical grating sets, each of said sets consisting of two parallel offset grating patterns arranged side-by-side;
    a grid piece having superimposed optical grating patterns formed thereon extending in orthogonal directions to each other so as to correspond to said two index optical grating patterns;
    support means supporting said grid piece and said index piece juxtaposed and positioned with respect to said index piece for constained movement relative said index piece in a position such as to create a fringe pattern by interference between each of said index optical patterns and a respective grid piece optical pattern;
    means illuminating said index and grid patterns;
    means detecting said fringe patterns and producing signals corresponding thereto;
    whereby signals corresponding to relative movement between said index piece and grid piece along either of said directions are produced, and the relative phasing of patterns produced by said offset patterns in each of said optical grating sets produces signals indicative of the direction of said movement.

2. The transducer of claim 1 wherein said index piece grating sets are arranged in a crossing relationship to each other.

* * * * *